United States Patent [19]

MacDonald

[11] 4,197,886
[45] Apr. 15, 1980

[54] FASTENER DRIVING TOOL AND FASTENER HOLDING NOSEPIECE

[75] Inventor: Murdo A. MacDonald, Bloomfield Hills, Mich.

[73] Assignee: Clyde Corporation, Auburn Heights, Mich.

[21] Appl. No.: 830,652

[22] Filed: Sep. 6, 1977

[51] Int. Cl.$^2$ ............................................. B25B 23/00
[52] U.S. Cl. .................................... 144/32 R; 29/240; 173/59; 173/163; 227/149; 408/56
[58] Field of Search ............... 145/51, 52, 50 B, 50 F; 227/149; 144/32; 7/165; 408/56, 57, 59; 173/59, 71, 163; 29/240

[56] References Cited

U.S. PATENT DOCUMENTS

| | | | |
|---|---|---|---|
| 2,327,074 | 8/1943 | Snyder | 144/32 |
| 2,830,560 | 4/1958 | Doeden | 173/59 |
| 2,840,126 | 6/1958 | Schmitt | 144/32 |
| 3,275,047 | 9/1966 | Kulman | 144/32 |
| 3,965,510 | 6/1976 | Ernst | 7/165 |
| 3,967,664 | 7/1976 | Lesner et al. | 144/32 R |
| 3,973,858 | 8/1976 | Poisson et al. | 144/32 R |

FOREIGN PATENT DOCUMENTS

| | | | |
|---|---|---|---|
| 372622 | 11/1963 | Switzerland | 144/32 |
| 404557 | 1/1934 | United Kingdom | 145/50 F |

*Primary Examiner*—R. L. Spruill
*Assistant Examiner*—W. D. Bray

*Attorney, Agent, or Firm*—Barnes, Kisselle, Raisch & Choate

[57] ABSTRACT

In a fastener driving tool having a fastener holding nosepiece comprised of three concentric sleeves, the middle one of which is axially movable to carry a circumferential array of radially shiftable balls to and from inwardly cammed engagement against cam surfaces in the outer sleeve to grip the fastener head against the inner sleeve and release the head, improved structure wherein (1) the inner and outer sleeves have portions axially displaced from the middle sleeve which are threadedly connected to adjust the axial distance between the cam surfaces and inner sleeve for accommodating fastener heads of different axial thicknesses and radial tolerances; (2) to facilitate interchangeability of nosepieces, the inner sleeve is axially slidably retained on an adapter sleeve against a spring bias by a pin and slot connection with inner and adapter sleeves having means cooperable upon relative turning thereof to withdraw the pin from the slot and the pin being movable inwardly into engagement with a retaining ring to retain the spring in the adapter sleeve when the inner sleeve is removed therefrom; (3) the nosepiece is optionally provided with an adapter adapted to be mounted on the fastener driver of the tool rather than the tool body; and (4) where the tool is air driven, ducting is provided to introduce exhaust air from the tool into the sleeves for blowing foreign matter out of the nosepiece.

50 Claims, 16 Drawing Figures

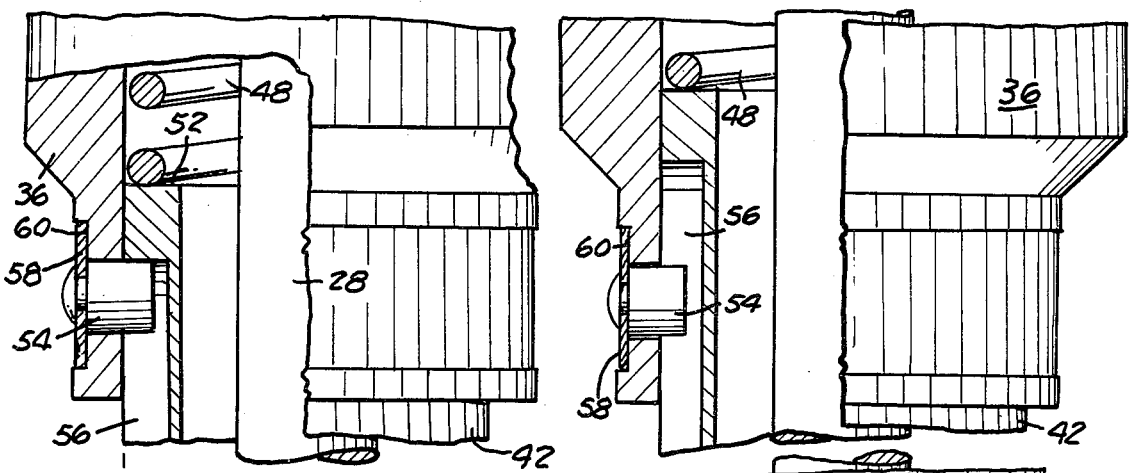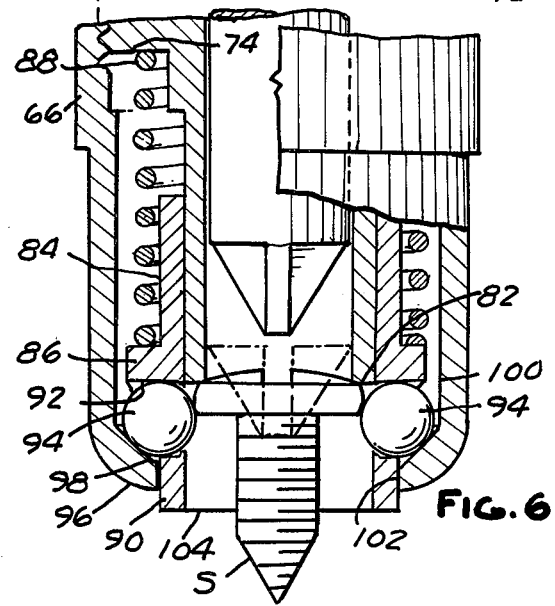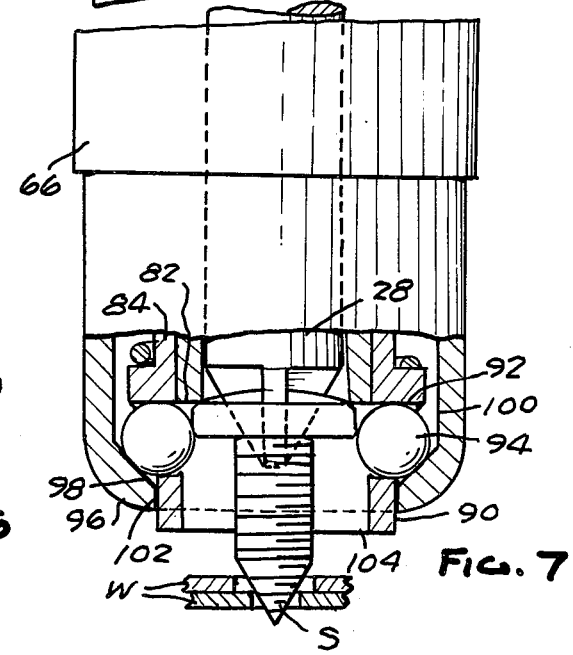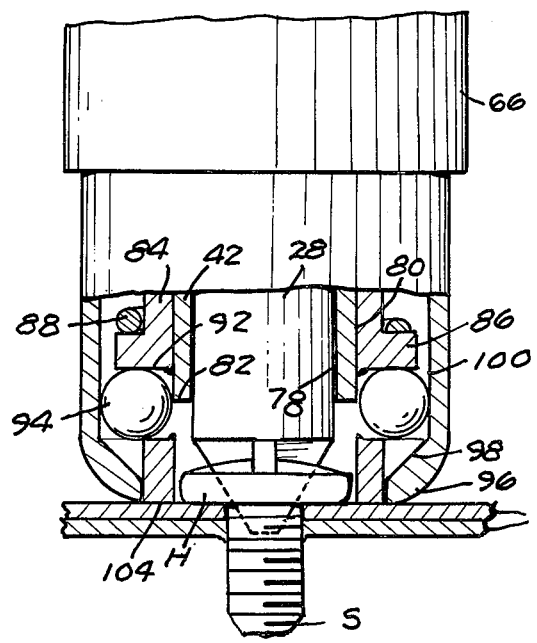

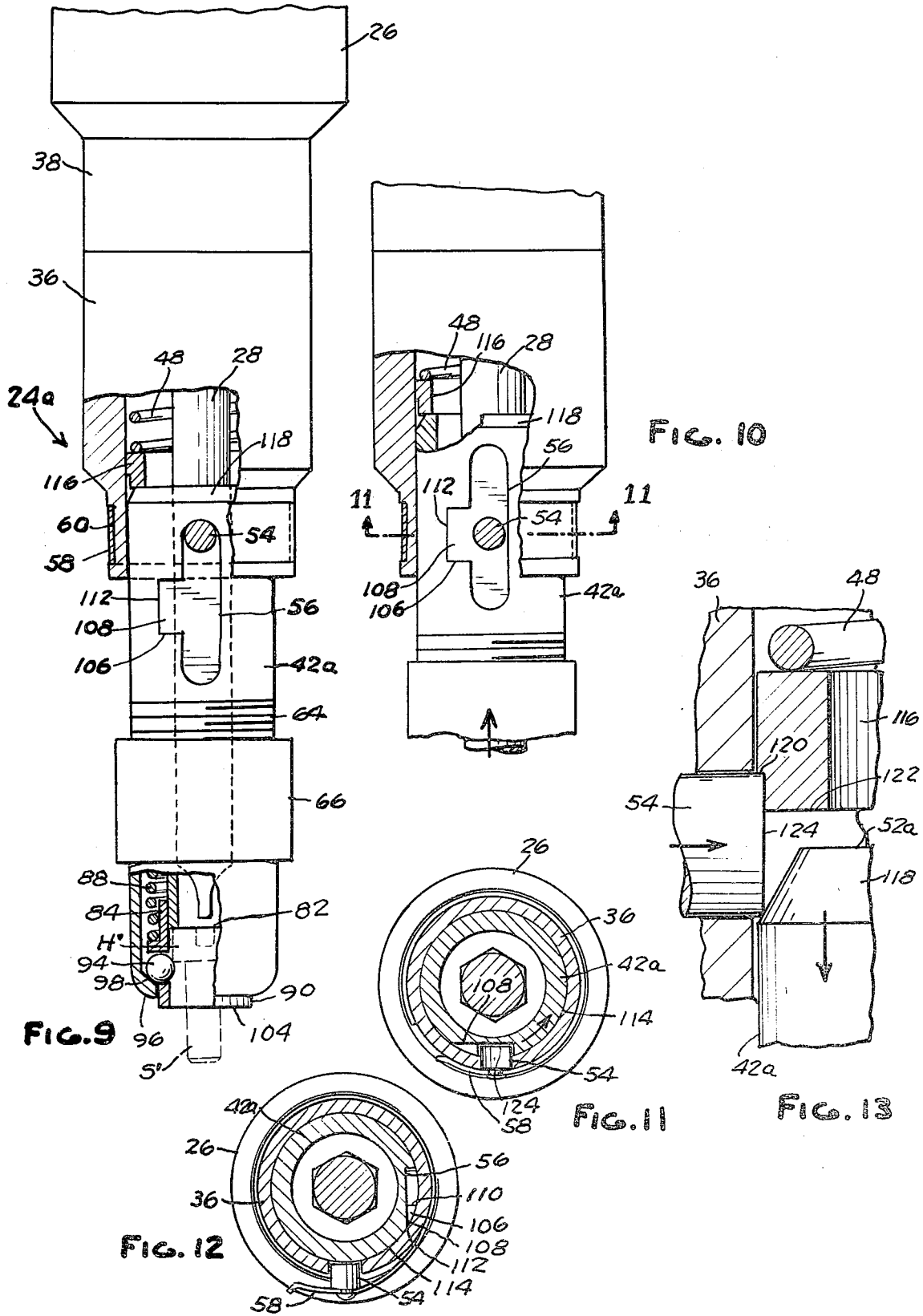

FASTENER DRIVING TOOL AND FASTENER HOLDING NOSEPIECE

This invention relates generally to a power driven tool of the type having a nosepiece for holding an article such as a screw or nail having a head and a shank in alignment with a driver which drives the article against a work piece.

More particularly, the invention is concerned with an improved nosepiece for such tools. Selected for illustration of the invention is a power screw driver.

Conventional tools of the type under consideration fall generally into two categories. In one, the screw to be driven is fed to the rear of a pair of jaws aligned with the driver and biased by springs to closed condition. The point or front end of the screw is forced through the jaws until the head of the screw abuts against the rear faces of the jaws, the jaws gripping the shank of the screw. When the driver is advanced, it forces the screw forwardly causing the head to separate the jaws thereby releasing the screw so that it can be driven into the work.

In this type of tool a succession of screws is usually fed to the jaws, one at a time, from a magazine or through a pneumatic tube, or the like. This type of tool is thus inherently relatively expensive and bulky and is unsuited for use in many operations where it is desirable to load the screws into the tool by simply inserting them head first into the front of the nosepiece. Moreover, the jaws in the rear loading nosepiece must be biased together with sufficient force to prevent the screw head from separating them and escaping during the jaw-loading procedure. The magnitude of this force renders it difficult and impracticable to try to load screws head first into the front end of the jaws. If the force were diminished sufficiently to facilitate easy front loading of the jaws, they would not hold a screw satisfactorily.

In the other conventional category, the screws are loaded head first into or onto the tool, but the holding device comprises simply a magnetized bit on the driving tool. The deficiencies of this arrangement are numerous and notorious: the bits are relatively expensive and must be replaced frequently since they will not hold a screw when even slightly worn; they will not hold a screw unless clear of dirt and metal particles and thus must be cleaned frequently; the bit will not hold the screw unless the screw head is rotationally aligned so that its slotting mates with the bit; the axis of the screw must be precisely aligned with that of the screw driver to avoid losing the screw or grinding chips off of a screw head which then requires cleaning of the bit; the bit will not hold in horizontal position a relatively long shank screw having a small diameter head; in general, magnetic bits are only suitable for use with Phillips head screws and not straight slotted screws; even under optimum conditions, a screw can be knocked off of the bit or cocked on the bit if even lightly brushed against or by another object.

A third conventional category of screw driver utilizes a magnetic bit in combination with a spring-type guide which engages the outer periphery of the screw head, but this arrangement is only useful where the screw is of a special type having a circumferential flat portion against which the guide engages to provide lateral support for the screw.

U.S. Pat. No. 3,967,664 discloses a front loading nosepiece which largely avoids the deficiencies of the prior art structures discussed above. However, over the course of time, it has become apparent that this patented nosepiece leaves something to be desired in several different ways. First, it is lacking in a readily accessible, quickly and conveniently operable means for adjustment to accommodate screw heads having substantially different axial thickness. Second, most screws are notoriously cheaply made and screw heads having a given nominal diameter may vary in actual diameter or may be out of round by as much as 0.020" from batch to batch or manufacturer to manufacturer. The patented nosepiece is lacking in a readily accessible, quickly and conveniently operable means for adjustment to maintain a tight grip on screw heads so varying in diameter or shape. Third, it would be advantageous for the nosepiece, per se, to be quickly and conveniently detachable from and attachable to the adapter by which it is mounted on a tool to facilitate selective use of a number of nosepieces dimensioned to accommodate screw heads of different nominal diameters. The patented nosepiece is lacking in such a feature.

Fourth, under some conditions, should the operator of a hand held tool equipped with the patented nosepiece attempt to use a screw held thereby as a drift pin to lever two slightly misaligned holes into full registry preparatory to driving a screw, the grip of the nosepiece on the screw is lost and the driving operation is delayed. Fifth, in circumstances where low cost is a predominating factor, it would be desirable to be able to mount the nosepiece directly on the driver of the tool rather than on the motor housing. The patented nosepiece provides no such structure. Sixth, in driving a succession of some types of screws such as chrome plate screws, flakes or particles of metal from the screws tend to accumulate within the nosepiece eventually requiring that it be disassembled for cleaning. The patented nosepiece has no provision for alleviating this condition.

The object of this invention is to provide a relatively simple, inexpensive front loading nosepiece structure improved to provide the various features mentioned above as lacking in nosepieces of the type disclosed in the patent referred to. In the drawings:

FIGS. 6, 7 and 8 are views generally similar to FIG. 5 but showing subsequent successive steps in loading the screw into the nosepiece and driving the screw into a work piece;

FIG. 9 is an elevational view of a modified form of the invention mounted on a tool body with portions broken away and shown in section to illustrate structural detail;

FIG. 10 is a fragmentary view generally similar to FIG. 9 but showing parts of the nosepiece in a different relative position;

FIG. 11 is a sectional view on line 11—11 of FIG. 10;

FIG. 12 is a view similar to FIG. 11 but showing parts of the nosepiece in a different relative position;

FIG. 13 is an enlarged scale fragmentary sectional view illustrating the relation of parts of the adapter and nosepiece prior to their disengagement;

Figure 2:
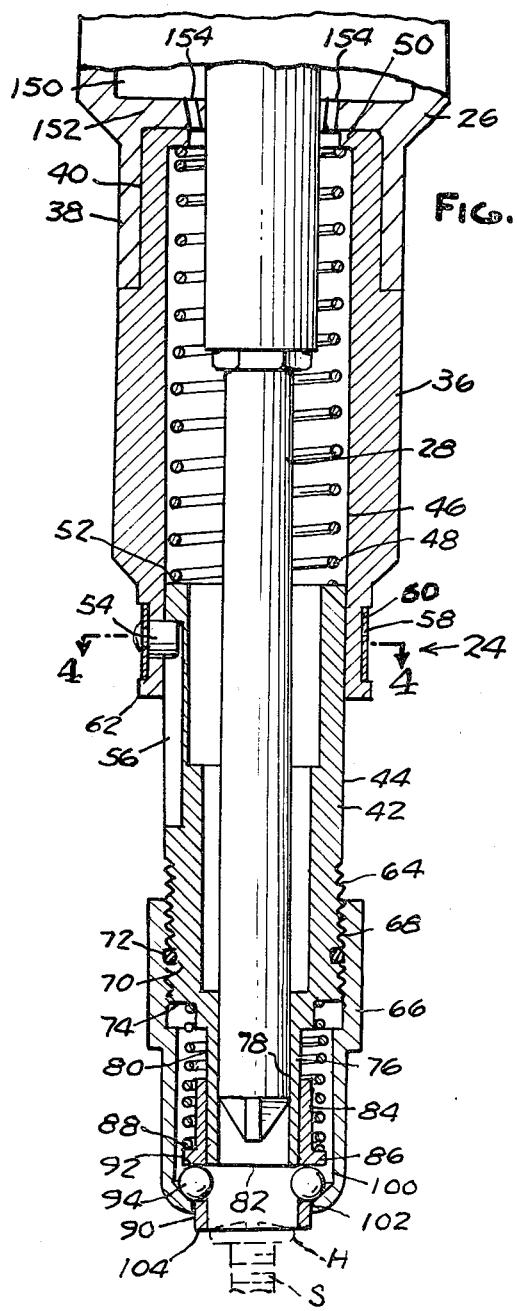
FIG. 2 is an enlarged scale longitudinal sectional view through the nosepiece and a portion of a tool body on which it is mounted.
Figure 4:
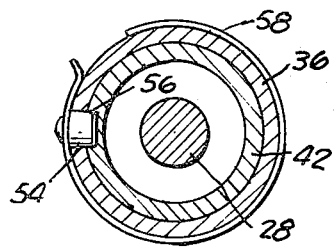
FIG. 4 is a sectional view on line 4—4 of FIG. 2.
Figure 3:
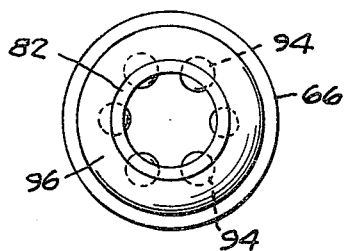
FIG. 3 is a bottom plan view of the nosepiece on the scale of FIG. 2.

Shown in the drawings is an assembly 20 of a fastener driving tool 22 and a nosepiece 24 according to the invention mounted thereon. Tool 22 has a body 26 which houses a motor (not shown) for rotating a fastener driving tool 28 such as a screwdriver bit as shown in FIG. 2. While in general the motor may be of any suitable conventional type such as pneumatic or electric, with respect to one of the several aspects of the present invention, it is preferable that the motor be air driven as is discussed in detail below. If tool 22 is to be hand held, it is provided with a handle 30 having a power supply line 32 such as an air duct and is provided with a trigger 34 for manually starting and stopping the motor.

Nosepiece 24 comprises an adapter 36 having the form of a sleeve adapted to be mounted in concentric relation around driver 28. Sleeve 36 is adapted to be secured by any suitable means such as press fitting, threading or otherwise to whatever mounting configuration may be provided on tool body 26 such as mounting ring 38. For example, adapter 36 and ring 38 could be threadedly interengaged or press fitted together at 40. A sleeve shaped member 42 has an outer surface portion 44 which is axially slidable fitted within the interior surfaces 46 of adapter 36. A spring 48 compressed between an internal rear flange 50 on adapter 36 and a rearward end 52 of sleeve 42 urges sleeve 42 in a forward direction relative to the adapter. Sleeve 42 is slidably retained on adapter 36 against the force of spring 48 by suitable means such as a pin 54 on adapter 36 engaged within an axial slot 56 in sleeve 42. Pin 54 is carried by and urged radially inwardly by a split spring collar 58 fitted within a groove 60 adjacent the forward end 62 of adapter 36.

Sleeve 42 has a threaded portion 64 and an outer sleeve or cap 66 has an internal portion threadedly engaged therewith at 68. Threaded portion 64 of sleeve 42 has a circumferential groove 70 which contains an O-ring 72 frictionally engaged with the threading in outer sleeve 66 to resist relative turning of sleeves 42,66 for a purpose to be described. Sleeves 42,66 are supported in substantially concentric relation around the axis of driver 28.

Sleeve 42 adjacent the forward end of threaded portion 64 is stepped radially inwardly to form a shoulder 74 and continues in a portion 76 of reduced diameter having an interior surface 78 providing a guide for the forward end of bit 28 and an exterior surface 80 which extends to forward end 82 of sleeve 42. A middle sleeve 84 is axially slidably disposed about surface 80 and has an outward radial flange 86 aligned axially with step 74. A spring 88 compressed between step 74 and flanges 86 urges sleeve 84 forwardly with respect to inner sleeve 42 and outer cap 66.

From flange 86 sleeve 84 continues forwardly in a portion 90 which contains a circumferential array of radial openings 92 each of which contains a ball 94 radially movable therein. The inner ends of openings 92 are constricted to a diameter smaller than that of balls 94 as shown at 95 (FIG. 5) to contain balls against radially inward egress from the openings. In the illustrated form of the invention, six openings 92 and six balls 94 are utilized. This number could be increased or could be reduced to as low as three depending on the requirements of a particular application.

Outer cap 66 has a forward end portion 96 which is formed radially inwardly to a diameter smaller than the outer diameter of the array of balls 94 to contain the balls and middle sleeve 84 within the outer cap against the force of spring 88. End portion 96 has a circumferential interior surface portion 98 which slopes radially inwardly in a forward direction to form a cam surface effective to cam balls 94 radially inwardly upon forward movement of middle sleeve 84 to relative to outer cap 66. In forward positions of sleeve 84 relative to cap 66, the radially inner surface portions of balls 94 lie on a circle having a diameter smaller than the diameters of the heads of screws with which the nosepiece is adapted to be used. In such forward positions, the inner surface portions of the balls are in axial alignment with forward end 82 of sleeve 42 (FIGS. 2, 6 and 7).

Rearward of cam surface 98, outer cap 66 has an internal surface portion 100 of larger diameter to free balls 94 for radial outward movement in openings 92 to a location at which their inner surfaces lie on an expanded diameter which is large enough to allow the head of an article such as a screw to pass axially forwardly and rearwardly therebetween. Forward portion 90 of sleeve 84 projects axially forwardly through a forward end opening 102 in outer cap 66 except in the final stages of driving a screw as is brought out in greater detail below. Forward portion 90 terminates in an end face 104.

Figure 5:
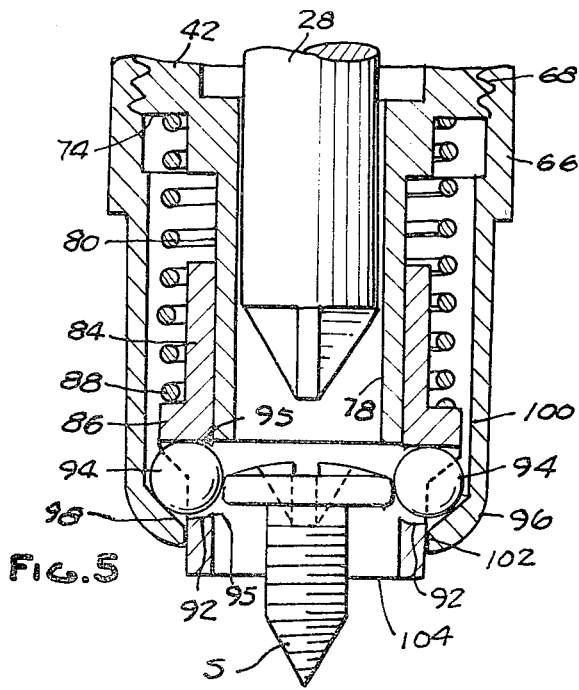
FIG. 5 is a further enlarged fragmentary longitudinal sectional view of the lower end of the nosepiece showing an initial step in loading a screw into the nosepiece.

In use, prior to being loaded with a screw, the various parts of nosepiece 24 are in the relative positions shown in FIG. 2. Inner sleeve 42 is held in forward position by spring 48 and middle sleeve 84 is held in its forward position by spring 88 so that end portion 90 thereof projects forwardly through opening 102 in outer sleeve 66 and balls 94 are cammed radially inwardly by cam surface 98. To load a screw S into the nosepiece, its head H is inserted within end 90 of middle sleeve 84 and is engaged against the inwardly projection portions of balls 94. Upon pushing the screw head further axially rearwardly, spring 88 yields, permitting sleeve 84 to move rearwardly under the force exerted on balls 94. As sleeve 84 and the balls move rearwardly, the balls become radially aligned with progressively larger diameter portions of cam surface 98 and the balls are cammed outwardly by engagement of the screw head with their spherical surfaces as illustrated in FIG. 5. Surface 100 has a diameter large enough to allow balls 94 to shift outwardly to locations where screw head H can pass axially beyond them.

When the screw head passes axially rearwardly of the innermost portions of the balls, spring 88 snaps middle sleeve 84 axially forwardly causing balls 94 to be cammed inwardly into engagement with the head of the head of the screw as shown in FIG. 6. In this position, balls 94 cooperate with end 82 of inner sleeve portion 76 to grip the screw head securely in axial alignment with driver 28. The screw head cannot be pulled out of the nosepiece because its forward egress is blocked by balls 94 and the screw cannot be laterally cocked to any substantial extent from the axis of bit 28 because of the cooperating, circumferentially distributed clamping force of balls 94 and sleeve end 82 on the screw head.

Tool 22 is now manipulated so that screw S is properly aligned with work W (FIG. 7) and the tool is pressed axially forward. Sleeves 42,66,84 are prevented from moving forwardly by engagement of the screw with the work but tool body 26, driver 28 and adapter 36 move forwardly relative to the sleeves against the force of spring 48 to engage bit 28 with screw head H as shown. Trigger 34 is now actuated to rotate bit 28 for advancing screw S into the work. As the screw advances into the work, sleeves 42,66,84 advance as a unit with the screw until forward end 104 of middle sleeve 84 engages the work whereupon its movement is halted. Forward movement of sleeves 42,66 however, continues under the force of spring 48. This continued movement advances the progressively larger diameter portions of cam surface 98 into radial alignment with balls 94 releasing the balls for radial outward movement under the camming action of the advancing screw head H against their spherical surfaces. Head H can now pass axially forwardly between balls 94 and the screw can be driven home in the work. The position of the parts is now as illustrated in FIG. 8. Thereafter, when the tool and nosepiece are retracted away from the work, the parts return to the relative positions of FIG. 2 under the urging of springs 48 and 88.

It will be noted that balls 94 and sleeve end 82 do not release their grip on screw head H until the screw has been driven well into the work so that even with a relatively short screw there is little or no opportunity for misalignment between bit 28 and the screw from the time that the screw is first loaded into the nosepiece until the time it is driven home. The grip of balls 94 and sleeve end 82 on screw head H is so secure that even a lateral blow of considerable force can not dislodge screw S from the nosepiece or knock it askew. While held in nosepiece 24, a screw can be inserted into misaligned openings in a work piece and used as a drift pin to lever the openings into full registry without becoming axially misaligned from driver 28.

To adjust nosepiece 24 for use with screw S having heads with substantially different axial thicknesses it is only necessary to turn outer sleeve or cap 66 with respect to inner sleeve 42. Threading 68 causes outer sleeve 66 to move axially on inner sleeve 42 and this movement adjusts the axial distance between cam surface 98 on the outer sleeve and end 82 of the inner sleeve. This adjustment determines the axial distance between end 82 of sleeve 42 and the inward surface portions of balls 94 at the point where the balls engage a screw head H to clamp it against end 82. For use with a screw head H of relatively small axial thickness (FIG. 6), cap 66 is turned to move cam surface 98 upwardly as the drawings are viewed while to adjust the nosepiece to accommodate an axially thicker screw head (FIGS. 9 and 14), cap 66 is turned to increase the axial distance between cam surface 98 and end 82. In a typical nosepiece according to the present invention, this range of adjustment is about 1/10 of an inch.

Adjustment of nosepiece 24 to compensate for departure of screw heads H from their nominal diameters or from their nominally round shape is also accomplished by turning cap 66 relative to inner sleeve 42 for varying the axial distance between cam surface 98 and sleeve end 82. By increasing this distance, balls 94 will engage head H on a circle of relatively larger diameter while by decreasing this distance the circle of engagement will be relatively smaller. This adjustment is usually relatively fine as compared to the adjustment for accommodating heads H of different axial thicknesses. Thus when an operator uses a nosepiece 24 to drive a number of screws having heads H of a given thickness and diameter he effects initial adjustment of both factors by inserting head H into the nosepiece and turning cap 66 until balls 94 and sleeve end 82 properly grip head H. Subsequently should the operator encounter screw heads H of nominally the same specifications but from a different batch having different actual diameters or eccentricities, he merely makes a relatively fine adjustment of cap 66 to compensate for the difference and insure proper gripping of the screw heads between balls 94 and sleeve end 82. In a typical nosepiece 24 this range of diametral adjustment is about 0.030".

Outer sleeve 66 is retained in adjusted position by frictional engagement of O-ring 72 between the surfaces of groove 70 in inner sleeve 42 and the threading on outer sleeve 66. While this resistance is sufficient to retain outer sleeve 66 in adjusted position during use, it is readily yieldable to manual force to facilitate the adjustment. The use of O-ring 70 is the preferred means for providing frictional resistance. However, other means could be employed such as a slight interference fit between threading 68 on sleeves 42, 66 or a frictional plastic or mastic material between the threads on the sleeves.

The nosepiece 24a shown in FIGS. 9–13 is similar in structure and functioning to nosepiece 24 except that a quick-disconnect attachment is provided between inner sleeve 42a and adapter 36. For this purpose, the outer wall surface of sleeve 42a is provided with a recess 106 having a bottom surface 108 which extends chordally of the sleeve between an inner end 110 which opens into slot 56 and an outer end 112 which intersects exterior surface 114 of the sleeve. For a purpose described below, recess 106 has an axial dimension greater than the diameter of pin 54, typically by about 0.030" to 0.040". Also, a retainer ring 116 is interposed between spring 48 and rearward end 52a of sleeve 42a which is radially inwardly tapered or beveled at 118 (FIG. 13). Ring 116 is diametered to follow axial movements of inner sleeve 42a within adapter 36 as shown in FIGS. 9 and 10. Ring 116 has a radially inward step forming an annular shoulder 120 (FIG. 13) which faces the end 122 of the ring which engages end 52a of sleeve 42a.

The procedure for loading a screw into a nosepiece 24a and driving the screw into a work piece is identical to that described with respect to nosepiece 24. Should the operator want to drive a screw having a head diameter larger or smaller than that with which a nosepiece 24a is adapted to accommodate, he simply detaches inner sleeve 42a from adapter 36 by means of the quick disconnect feature described above and removes the assembly of sleeves 42a,66,84 and balls 94. He then selects another such assembly dimensioned and adapted to receive and hold screws having heads or larger or smaller diameters and connects it to adapter 36.

More particularly, the operator will grasp tool 22 or adapter 36 with one hand and sleeve assembly 42a,66,84 with the other hand, and press the two axially toward each other while exerting torque on the two in opposite directions. This causes pin 54 to advance in slot 56 from the FIG. 9 position to the FIG. 10 position in which pin 54 is aligned with recess 106. When pin 54 reaches this position, the manual torque exerted on adapter 36 and the sleeve assembly causes pin 54 to move circumferentially relative to sleeve 42a so that its inner end 124 (FIG. 11) engages against bottom 108 of the recess.

Entry of pin 54 into recess 106 is facilitated by the larger axial extent of the recess mentioned above. Since bottom 108 extends in a chordal direction, it cams pin 54 radially outwardly against the force of spring 58 and when the pin passes outer end 112 of the recess, it becomes supported in its outward position by the exterior surface 114 of inner sleeve 42a. Sleeve 42a is now free to be withdrawn from within adapter 36.

When sleeve 42 is withdrawn from within adapter 36, retainer ring 116 tends to follow sleeve 42a out of the adapter under the force of spring 48. However, when sleeve 42a withdraws, pin 54 at the same time returns radially inwardly under the force of spring 58 into the space vacated by sleeve 42a. The extent of inward movement of pin 54 is such that its inner end 124 moves radially inwardly of the outer diameter of ring 116 so that the pin becomes engaged by shoulder 120 on ring 116. This obstructs movement of ring 116 out of adapter 36 under the force of spring 48 and thereby retains spring 48 within the adapter.

To attach a newly selected sleeve assembly 42a,66,84 to adapter 36, beveled end 118 of inner sleeve 42a is simply axially inserted into the adapter. Beveled end 118 engages inner end 124 of pin 54 and cams the pin radially outwardly out of engagement with shoulder 120, ring 116 and spring 48 now being retained in the adapter by sleeve 42a. After sleeve 42a has been forced axially into the adapter far enough to align pin 54 circumferentially with some part of slot 56, the sleeve assembly and adapter are rotated relative to each other until pin 54 radially and slot 56 are in registry whereupon spring 58 snaps pin 54 radially into slot 56 and the attachment is complete.

In a typical nosepiece according to the present invention, the disconnecting procedure described above can be accomplished in less than a second and it can be done without the necessity of visual observation on the part of the operator. Similarly, connecting a newly selected nosepiece with adapter 36 requires less than a second. One factor facilitating quick reconnection is that sleeve 42a can be in any circumferential orientation relative to adapter 36 when the sleeve is inserted. The operator does not have to visually effect any circumferential alignment. He merely inserts the sleeve in the adapter and turns it until pin 54 snaps into slot 56.

Some applications require that a screw, head and all, be driven into a hole such as a counterbore in order to home the screw in the work. In such a case the screw is driven as far as possible by use of nosepiece 24a, sleeve assembly 42a,66,84 is disconnected from adapter 36 to expose driver 28 and the screw is then driven home. The sleeve assembly is then re-connected to adapter 36. Adjustment of nosepiece 24a to accommodate screws having heads of different axial thicknesses and radial tolerances is accomplished in the same manner as in nosepiece 24.

An assembly line for the manufacture of automobile bodies is a good example of an environment in which detachable nosepieces 24a are particularly useful. Items such as upholstery, arm rests and sun visors are installed by operators working inside the automobile body and usually each item requires a different type or size screw. Each operator is provided with a nosepiece sleeve assembly 42a,66,84 for each category of screw which he uses and can switch quickly from one assembly to another as required.

Figure 14:
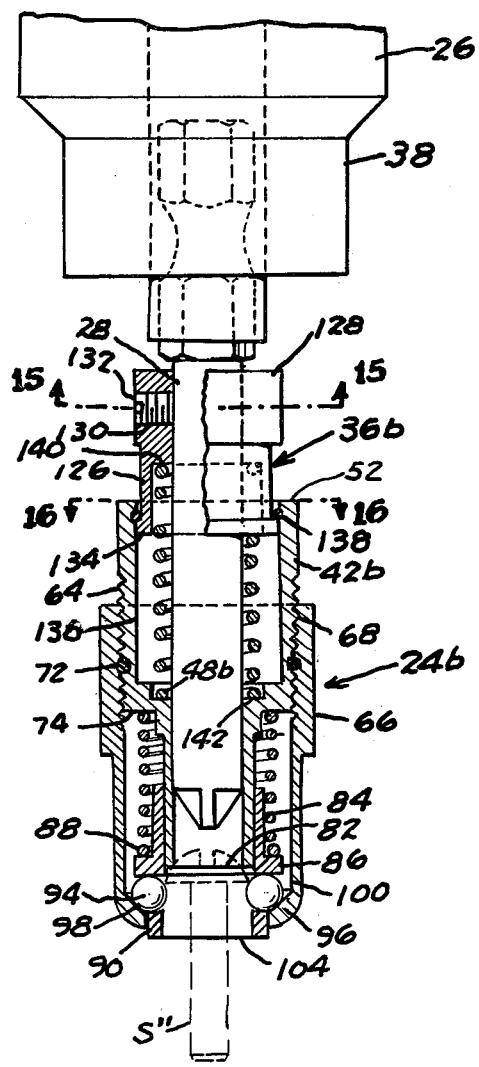
FIG. 14 is a longitudinal sectional view of another modified form of the invention mounted directly on the driver of a tool.
Figure 15:
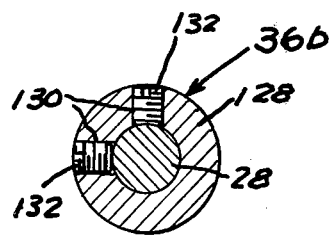
FIG. 15 is a sectional view on line 15—15 of FIG. 14
Figure 16:
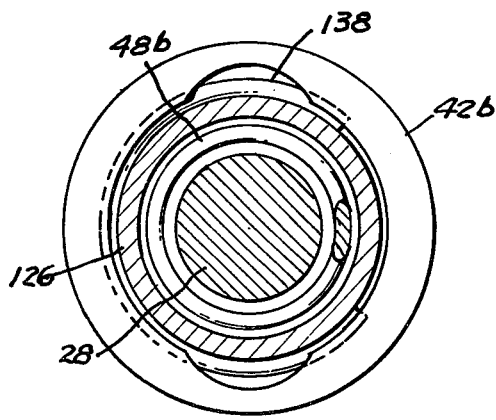
FIG. 16 is an enlarged scale sectional view on line 16—16 of FIG. 14.

The nosepiece 24b shown in FIGS. 14–16 is similar in structure and functioning to nosepieces 24 and 24a except that adapter 36b is adapted to mount inner sleeve 42b on driver 28 rather than on motor housing 26. Adapter 36 comprises a sleeve 126 dimensioned to be fitted around driver 28 and having a radially thickened end portion 128 provided with one or more threaded openings 130 containing a set screw 132 which can be clamped radially against driver 28. If more than one opening 130 and set screw 132 are employed, they are preferably circumferentially distributed around the axis of driver 28.

Sleeve 126 has an outwardly flanged end portion 134 which fits axially slidably within interior surface portion 136 of sleeve 42b rearwardly of shoulder 74. Adjacent rearward end 52 of sleeve 42b, its interior surface 136 is circumferentally grooved to receive a snap ring 138. When installed in its groove, the snap ring projects radially inwardly into the interior of sleeve 42b to obstruct egress of flange 134 out of sleeve interior 136 to secure adapter 36b and inner sleeve 42b together. Sleeve 126 has an internal radial shoulder 140 and sleeve 42b has an internal radial shoulder 142 axially aligned therewith. A spring 48b is compressed between shoulders 140,142 to urge sleeve 42b forwardly with respect to adapter 36b.

To mount a nosepiece 24b on a tool 22 adapter 36b is merely slipped over driver 28 and set screws 132 are tightened. In use of nosepiece 24b, loading of screws into the nosepiece and driving them into the work is identical to the procedure described above with respect to nosepiece 24. Similarly, adjustability of nosepiece 24b to accommodate article heads of different axial thicknesses and radial tolerances is accomplished in the same way as in nosepiece 24.

Figure 1:
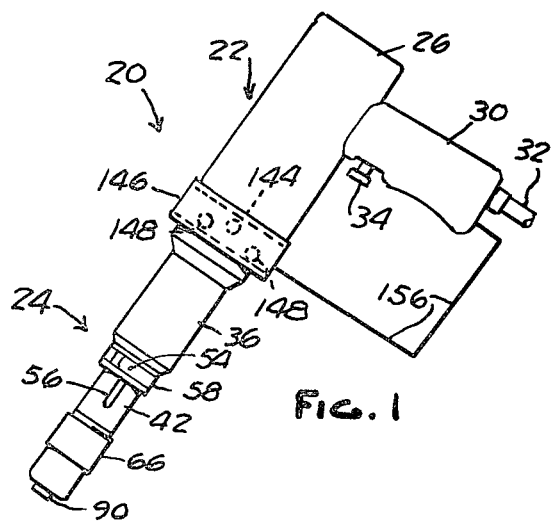
FIG. 1 is a generally side elevational view of a fastener driving tool and fastener holding nosepiece according to the present invention.

A further modification of the invention is illustrated in FIGS. 1 and 2. In this modification, the motor (not shown) for driver 28 is air driven and exhaust air from the motor is utilized to blow foreign matter such as metal flakes from plated screws out of the interior of nosepiece 24 or 24a. In some air driven tools 22, the exhaust air from the air motor escapes from motor housing 26 through one or more ports 144 in the housing side wall as represented in FIG. 1. Where this is the case, a manifold ring 146 is provided around the motor housing to collect the exhaust air issuing from ports 144 and porting 148 is provided for reintroducing the exhaust air from within ring 146 to the interior of the motor housing. The arrangement is such that porting 148 introduces the exhaust air into portions 150 of housing 26 axially forward of any bearing structure for the air motor to avoid blowing lubricant from the bearing into the nosepiece.

From housing portion 150 the exhaust air is conducted into the interior of adapter 36 and this may be done in any one of several ways depending upon the configuration of the interengaged parts of the motor housing and adapter. For example, in the illustration of FIG. 2, motor housing 26 has an end wall 152 which in part defines housing interior portion 150 and end wall 152 contains porting 154 through which the exhaust air enters adapter 36. In other equipment, the walls defining interior 150, end wall 152 and porting 154 might comprise portions of adapter 36.

In use, the exhaust air issuing through exhaust porting 144 is conducted to the interior of adapter 36 through porting 148,154 and flows forwardly through sleeve 42 and out of nosepiece 24 through end 104 of sleeve 84. This flow of air tends to purge the interior of the nosepiece of any dirt, metal flakes or other foreign matter which might otherwise tend to accumulate in the nosepiece.

In some air driven tools 22, the exhaust air is conducted out of motor housing 26 through handle 30. In this case, the exhaust air would be conducted by an air line 156 either to within manifold ring 146 if it is used or alternatively, directly to porting 148.

I claim:

1. In a nosepiece of the type having means forming inner, middle and outer members adapted to be mounted in concentric relation around the driver of a tool with which said nosepiece is adapted to be used, the middle member being axially movable between a forward position and a retracted position relative to said inner and outer members and being spring biased toward said forward position, a plurality of locking elements secured in a radially inward position by engagement with surface portions of said outer member when said middle member is in said forward position for clamping the head of an article such as a screw axially against a surface of said inner member in alignment with such driver, said elements being released for radially outward movement to pass an article head when said middle member retracts from said forward position, improved structure wherein, said inner and outer members have means displaced axially rearwardly of said middle member which are adapted to be interconnected, and means forming between said axially displaced means a connection which includes means operable to effect relative axial movement of said inner and outer members for adjusting the axial distance between said surface portions of said outer member and said surface of said inner member whereby to adapt said nosepiece for clamping article heads of different axial thickness and radial tolerances in alignment with said driver.

2. The structure defined in claim 1 wherein said inner and outer members comprise sleeves, said axially displaced means comprising portions of said sleeves threadedly interengaged to form said connection, and means providing frictional resistance to relative turning movement of said sleeves to secure said sleeves in axially adjusted relation.

3. The nosepiece defined in claim 2, including an article driving tool mounted thereon.

4. The structure defined in claim 1 and including in addition, means effective to secure said inner and outer members in axially adjusted relation.

5. The structure defined in claim 4 wherein the latter said means is frictional.

6. The structure defined in claim 5 wherein said connection comprises interengaged threaded means on said axially displaced means, said frictional means being effective to resist relative turning of said interengaged threaded means.

7. The structure defined in claim 6 wherein said frictional means comprises on O-ring frictionally interengaged between said threaded means.

8. The structure defined in claim 1 wherein said inner and outer members are sleeves, said axially displaced means comprising portions of said sleeves, one of said sleeve portions being radially stepped to interengage the other sleeve portion.

9. The structure defined in claim 8 wherein said inner sleeve is radially stepped outwardly so that said axially displaced portion thereof forms an enlargement, the exterior of said enlargement and the interior of said axially displaced portion of said outer sleeve having interengaged threads which form said connection, and means providing frictional resistance to relative turning movement of said sleeves to secure said sleeves in axially adjusted relation.

10. The structure defined in claim 9 wherein said middle member comprises a sleeve slidably engaged around said inner sleeve between said surface and said step of said inner sleeve.

11. The structure defined in claim 10 wherein said step forms a shoulder, said middle sleeve having a radially outwardly extending shoulder, and a spring compressed between said shoulders which provides said bias.

12. The structure defined in claim 11 wherein said middle sleeve has a circumferential array of radial openings forwardly of said end of said inner sleeve, said locking elements comprising a plurality of balls carried radially movably within said openings, said surface portions of said outer sleeve being oriented to cam said balls radially inwardly for clamping an article head upon movement of said middle sleeve to said forward position.

13. The structure defined in claim 1 wherein one of said inner and outer members has an extension extending axially rearwardly of said connection, and an adapter having an axially slidable attachment to said extension, said adapter being so adapted to mount said members around the driver of a tool.

14. The structure defined in claim 13 wherein said one member is said inner member.

15. The structure defined in claim 14 wherein said adapter has means adapted to be secured to the body of a tool relative to which such driver moves.

16. The nosepiece defined in claim 15, including an article driving tool mounted thereon.

17. The structure defined in claim 15 wherein said inner member and adapter comprise axially slidably nested sleeves, the outer one of which carries a pin slidably engaged in an axial slot in the inner one to provide said attachment.

18. The structure defined in claim 17 wherein said inner sleeve has a wall portion with an exterior surface, said pin extending into said slot under a yieldable spring bias, said wall portion having a recess extending in a direction chordal of said inner sleeve, said recess having an inner end which opens into said slot, an outer end which opens at said exterior surface and a bottom extending between said ends, said sleeves being relatively turnable when said pin and recess are circumferentially aligned, said pin having a radially inner surface portion engageable with said bottom upon relative turning of said sleeve, said bottom being effective to cam said pin portion radially outwardly against the latter said bias onto said exterior surface responsive to said turning to facilitate detachment of said inner sleeve from said adapter.

19. The structure defined in claim 18 wherein spring means urges said inner sleeve axially forwardly of said adapter, a retainer disposed axially between said inner sleeve and said spring means, said retainer being axially shiftable in said adapter upon relative axial movement of said sleeves, said pin being movable radially inwardly under the latter said spring bias and forming an obstruction to expulsion of said retainer from said adapter by said spring means when said inner sleeve is detached from said adapter whereby to retain said spring means in said adapter.

20. The structure defined in claim 19 wherein said inner sleeve has an end portion axially adjacent said retainer which is shaped to cam said pin portion radially outwardly to release said retainer for engagement against said inner sleeve under the urging of said spring means responsive to insertion of said inner sleeve into said adapter.

21. The structure defined in claim 20 wherein said end portion of said inner sleeve is beveled around its circumference to facilitate so camming of said pin portion in any relative circumferential orientation of said sleeves.

22. The structure defined in claim 20 wherein said retainer is a ring, said ring having an end engaged against said inner sleeve, said ring having a portion adjacent said end which is stepped radially inwardly to form a shoulder which engages said pin when said inner sleeve is detached from said adapter.

23. The structure defined in claim 20 wherein said pin is carried by a radially stressed partial collar around said adapter which provides the latter said bias.

24. The structure defined in claim 14 wherein said adapter has means adapted to be secured to the driver of a tool so that said nosepiece is supported by such driver.

25. The structure defined in claim 24 wherein said inner member and adapter comprise axially slidably nested sleeves, said adapter having an interior dimensioned to fit circumferentially around such driver and having means adapted to be releasably clamped against such driver.

26. The structure defined in claim 25 wherein the latter said means comprises a wall portion of said adapter having at least one threaded opening therein and a set screw in said opening engageable with such driver.

27. The structure defined in claim 26 wherein said wall portion is adjacent an end of said adapter and is radially thicker than other wall portion of said adapter, said thicker wall portion having a plurality of circumferentially spaced said openings and set screws therein.

28. The structure defined in claim 27 wherein said wall portions adjoin at an internal shoulder in said adapter aligned with a shoulder in said inner sleeve, and a spring compressed between said shoulder to urge said inner sleeve toward an axially forward position relative to said adapter.

29. The structure defined in claim 28 wherein said adapter has adjacent its other end a radially outward flange which fits slidably within said inner sleeve, and means effective to contain said flange within said inner sleeve against the force of said spring.

30. The structure defined in claim 29 wherein the last said means comprises a split wire ring disposed in a circumferential groove in the interior of said inner sleeve and projecting radially inwardly of said groove for engagement by said flange.

31. The nosepiece as defined in claim 25, including an article driving tool mounted thereon.

32. The nosepiece defined in claim 1, including an article driving tool mounted thereon.

33. The combination defined in claim 32 wherein said tool is air driven and has exhaust air outlet porting, and duct means effective to conduct air issuing from said porting to the interior of said inner member.

34. The structure defined in claim 33 wherein said nosepiece is mounted on said tool by means of a hollow adapter, said duct means including in part, the interior of said adapter.

35. The structure defined in claim 34 wherein said tool has a body with a handle which has said porting, said duct means including a tube for conducting air between said porting and adapter.

36. The structure defined in claim 34 wherein said tool has a body with a side wall provided with said porting, said duct means including manifold means on said side wall for receiving air from said porting and other porting in said body for conducting air from said manifold means to said adapter interior.

37. The structure defined in claim 36 wherein said manifold means comprises a hollow ring which surrounds said body and into which the first said porting and said other porting open.

38. The structure defined in claim 36 wherein said other porting includes porting through said side wall into the interior of said body and porting through an end wall of said body into said adapter interior.

39. The structure defined in claim 36 wherein said motor has bearing means in said body, said other porting being disposed between said bearing means and adapter interior.

40. In a nosepiece of the type having means forming a holder for holding an article such as a screw, an adapter member adapted to mount the holder around the driver of a tool with which said nosepiece is adapted to be used for holding the article in alignment with the tool driver, the holder including a member supported by the adapter member and movable relative thereto in a direction axial of the driver, and spring means stressed between said members for urging said holder toward an axially forward position, improved structure which comprises,
- an element on each of said members, said elements being interengaged to retain said members in assembled relation against the stress of said spring means,
- said elements being disengageable to facilitate disassembly of said members,
- axially movable retainer means interposed between said spring means and one of said members,
- said element on the other of said members, responsive to disassembly of said one member from said other member, being engageable with said retainer means to form an obstruction to axial movement thereof under said stress for retaining said spring means on said other member,
- said element on said other member, responsive to assembly of said one member with said other member, being disengageable from said retainer means.

41. The structure defined in claim 40 wherein said other member comprises said adapter member.

42. The structure defined in claim 40 wherein said members comprise nested sleeves, one sleeve having a pin which projects radially into an axial slot in the other sleeve, said elements comprising said pin and an end of said slot,
- said other sleeve having a recess with a bottom surface which extends laterally from said slot to a peripheral surface of said other sleeve, said recess being dimensioned to receive said pin when the two are circumferentially aligned to enable relative turning of said sleeves, said bottom surface being effective to cam said pin radially to said peripheral surface responsive to said turning to facilitate disassembly of said sleeves.

43. The structure defined in claim 42 wherein said recess extends laterally from an axial mid portion of said slot.

44. The structure defined in claim 42 wherein said recess has an axial extent greater than the diameter of said pin.

45. The structure defined in claim 44 wherein said greater axial extent of said recess is at least about 0.030".

46. The structure defined in claim 42 wherein said one sleeve is the outer of said two sleeves and comprises said adapter member, said pin being spring biased radially inwardly into said slot, said peripheral surface comprising the exterior surface of said other sleeve.

47. The structure defined in claim 46 wherein said bottom surface extends in a direction generally chordal of said other sleeve.

48. The nosepiece defined in claim 40, including an article driving tool mounted thereon.

49. The structure defined in claim 40 wherein said members comprise nested sleeves, the outer of which forms said adapter member and the inner of which forms said holder member, said element on said outer sleeve comprising pin means spring biased radially inwardly for engagement with said element on said inner sleeve, said sleeves being provided with means cooperable upon relative movement thereof to withdraw said pin means radially outwardly from engagement with said element on said inner sleeve, said retainer means comprising a ring in said outer sleeve having an end engaged under said spring stress against an end of said inner sleeve, said ring having radial shoulder means facing said end thereof which engages said pin means responsive to disassembly of said inner sleeve from said outer sleeve to retain said ring and spring means in said outer sleeve.

50. The nosepiece defined in claim 49, including an article driving tool mounted thereon.

* * * * *

UNITED STATES PATENT AND TRADEMARK OFFICE
CERTIFICATE OF CORRECTION

PATENT NO. : 4,197,886
DATED : April 15, 1980
INVENTOR(S) : Murdo A. MacDonald

It is certified that error appears in the above-identified patent and that said Letters Patent are hereby corrected as shown below:

In column 3, line 61, delete "flanges" and insert -- flange --.

In column 3, line 63, delete "cap" and insert -- sleeve --.

In column 7, line 31, delete "radially".

Signed and Sealed this

Twelfth Day of August 1980

[SEAL]

Attest:

SIDNEY A. DIAMOND

Attesting Officer

Commissioner of Patents and Trademarks